US012689540B2

(12) United States Patent
Wang et al.

(10) Patent No.: US 12,689,540 B2
(45) Date of Patent: Jul. 21, 2026

(54) VEHICLE BUS TOPOLOGICAL GRAPH DISPLAY METHOD AND APPARATUS, AND DEVICE

(71) Applicant: Autel Intelligent Technology Corp., Ltd., Shenzhen (CN)

(72) Inventors: Weilin Wang, Shenzhen (CN); Hong Li, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 357 days.

(21) Appl. No.: 18/274,216

(22) PCT Filed: Dec. 16, 2021

(86) PCT No.: PCT/CN2021/138589
§ 371 (c)(1),
(2) Date: Jul. 26, 2023

(87) PCT Pub. No.: WO2022/160997
PCT Pub. Date: Aug. 4, 2022

(65) Prior Publication Data
US 2024/0097934 A1      Mar. 21, 2024

(30) Foreign Application Priority Data
Jan. 29, 2021    (CN) .......................... 202110130292.0

(51) Int. Cl.
*H04L 12/40*          (2006.01)
(52) U.S. Cl.
CPC .................. *H04L 12/40006* (2013.01); *H04L 2012/40273* (2013.01)

(58) Field of Classification Search
CPC ................ H04L 12/40006; H04L 2021/40273
See application file for complete search history.

(56) References Cited

U.S. PATENT DOCUMENTS

| | | | |
|---|---|---|---|
| 7,039,511 B1 * | 5/2006 | Kreuz | ....................... H04L 9/40 |
| | | | 701/32.7 |
| 11,952,013 B2 * | 4/2024 | El Rifai | .................. H04L 12/40 |
| 2014/0229846 A1 | 8/2014 | Abaya | |

FOREIGN PATENT DOCUMENTS

| | | |
|---|---|---|
| CN | 102481850 A | 5/2012 |
| CN | 105511442 A | 4/2016 |
| CN | 109933557 A | 6/2019 |

OTHER PUBLICATIONS

Search report of CN application No. 202110130292.0 issued on Jun. 7, 2023.

* cited by examiner

*Primary Examiner* — Chandrahas B Patel
(74) *Attorney, Agent, or Firm* — Andrew C. Cheng

(57) ABSTRACT

The embodiments of the present invention relate to the technical field of vehicle maintenance and repair, and in particular to a vehicle bus topological graph display method and apparatus, and a device. In the method, display priorities are set for vehicle buses of various types, display weights of different display areas of a display interface are acquired, and the buses with different display priorities are displayed in different display areas, such that a user can conveniently view the buses, and the ease of use by the user is improved.

20 Claims, 8 Drawing Sheets

Figure 1:
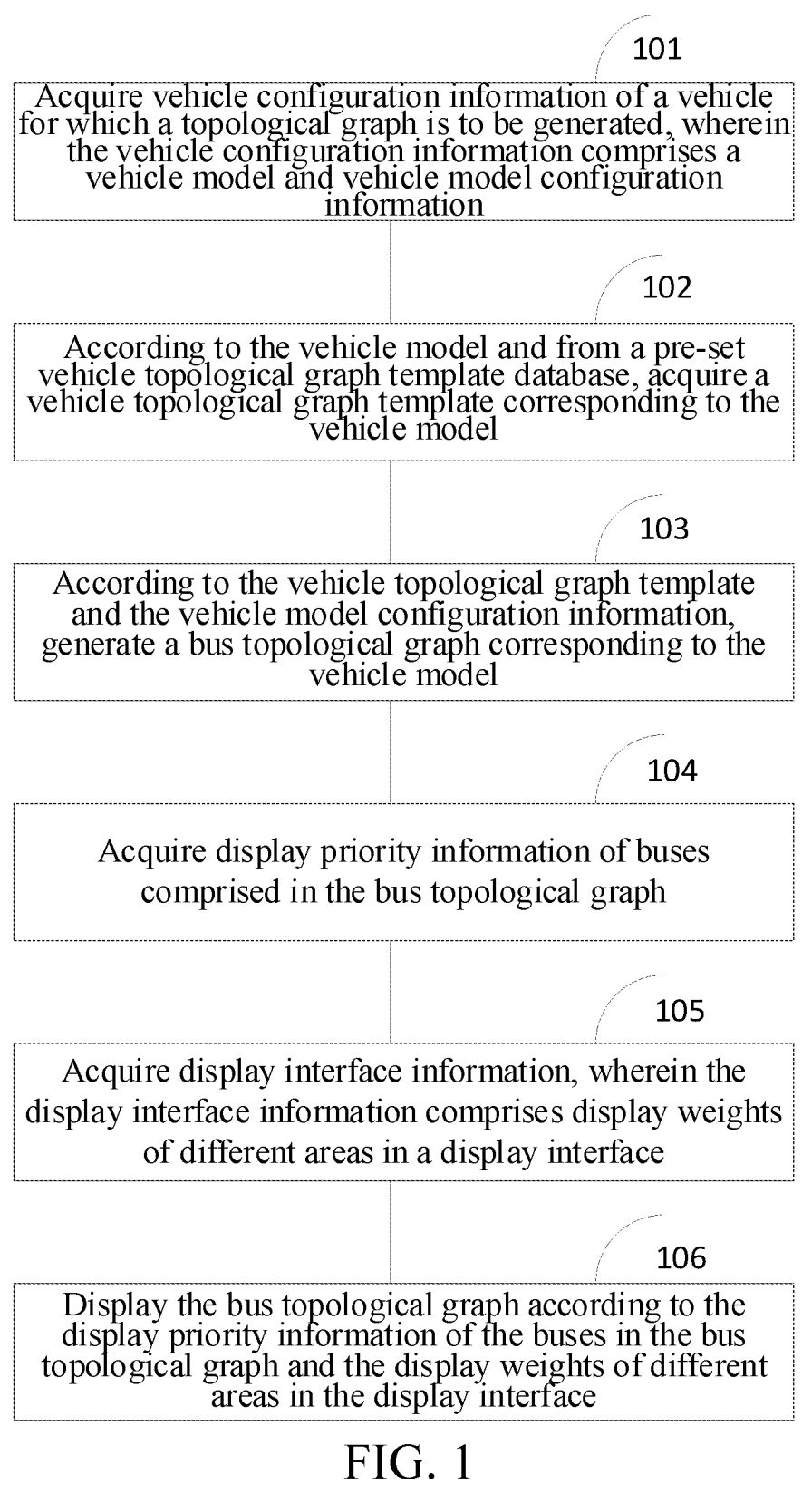

101

Acquire vehicle configuration information of a vehicle for which a topological graph is to be generated, wherein the vehicle configuration information comprises a vehicle model and vehicle model configuration information

102

According to the vehicle model and from a pre-set vehicle topological graph template database, acquire a vehicle topological graph template corresponding to the vehicle model

103

According to the vehicle topological graph template and the vehicle model configuration information, generate a bus topological graph corresponding to the vehicle model

104

Acquire display priority information of buses comprised in the bus topological graph

105

Acquire display interface information, wherein the display interface information comprises display weights of different areas in a display interface

106

Display the bus topological graph according to the display priority information of the buses in the bus topological graph and the display weights of different areas in the display interface

Receive a bus mark selection instruction

202

Acquire information about a selected undisplayed sub-node bus according to the bus mark selection instruction

203

Display the selected sub-node bus on the display interface

301

Receive a bus selection instruction

302

Acquire selected bus information and sub-node bus information associated with the selected bus according to the bus selection instruction

303

Highlighting displaying the selected bus and a sub-node bus associated with the selected bus on the display interface Topological graph template generation module 130

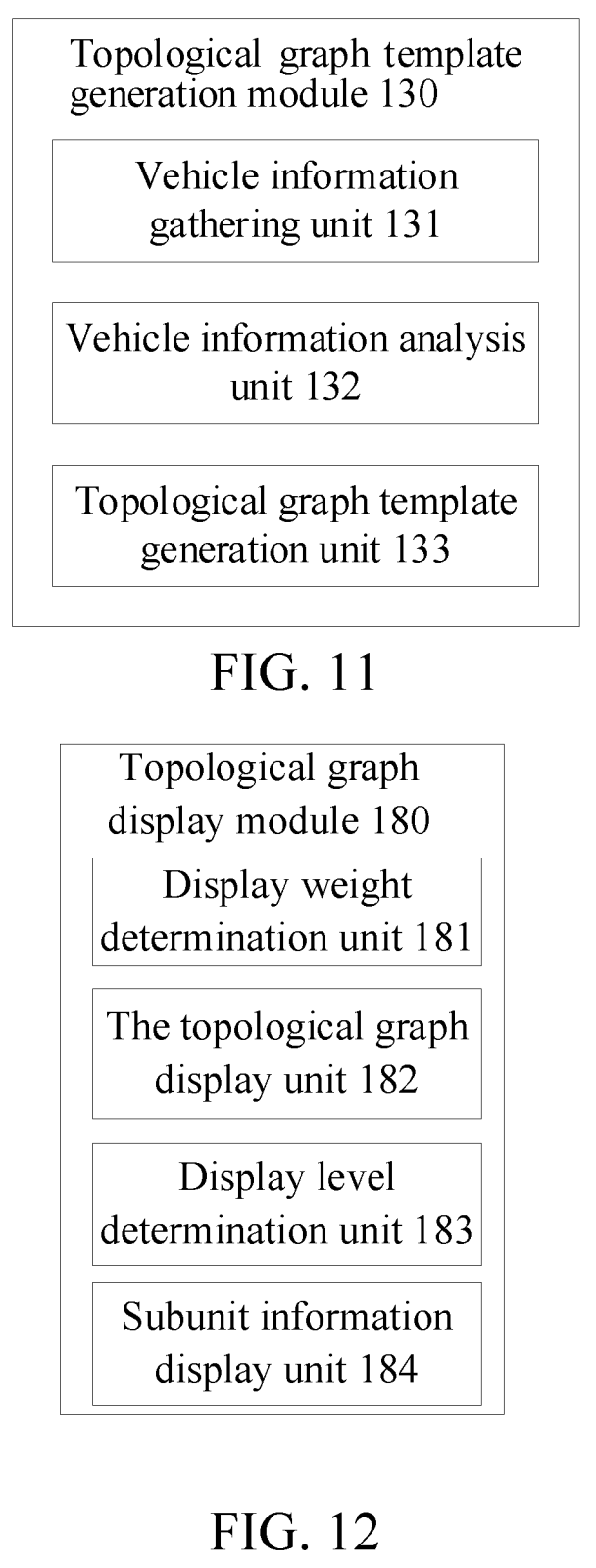

Vehicle information gathering unit 131

Vehicle information analysis unit 132

Topological graph template generation unit 133

FIG. 11

Topological graph display module 180

Display weight determination unit 181

The topological graph display unit 182

Display level determination unit 183

Subunit information display unit 184

FIG. 12

VEHICLE BUS TOPOLOGICAL GRAPH DISPLAY METHOD AND APPARATUS, AND DEVICE

CROSS REFERENCE

The present application is the National Stage application for PCT patent application Serial No. PCT/CN2021/138589, filed on Dec. 16, 2021, which claims priority to the Chinese patent application No. 2021101302920 entitled "vehicle bus topological graph display method and apparatus, and device" filed on Jan. 29, 2021, to the China National Intellectual Property Administration, the entire contents of which are incorporated herein by reference.

BACKGROUND

Technical Field

The embodiments of the present invention relate to the technical field of vehicle maintenance and repair, and in particular to a vehicle bus topological graph display method and apparatus, and a device.

Related Art

In vehicle maintenance and repair, a bus topological graph is a very useful analysis tool such that we can clearly understand the connecting status of a whole vehicle between the electronic control units, and it helps maintenance technicians quickly locate the direction of a problem from the macro level.

However, the applicant has found in the research that the existing diagnostic tools are generally aimed at a specific vehicle model or a specific brand. Since bus architectures of different vehicle models are quite different, and the display modes of the bus topological graph are also diversified, it is difficult for the existing diagnostic tools to accurately and comprehensively support multiple vehicle models, which brings challenges to the design and display of diagnostic tools.

SUMMARY

In view of the above issues, the embodiments of the present invention provide a vehicle bus topological graph display method and apparatus, and a device to solve the aforementioned problems existing in the prior art.

According to one aspect of an embodiment of the present invention, a vehicle bus topological graph display method is proposed, including:

acquiring vehicle configuration information of a vehicle for which a topological graph is to be generated, wherein the vehicle configuration information comprises a vehicle model and vehicle model configuration information;

according to the vehicle model and from a pre-set vehicle topological graph template database, acquiring a vehicle topological graph template corresponding to the vehicle model;

according to the vehicle topological graph template and the vehicle model configuration information, generating a bus topological graph corresponding to the vehicle model;

acquiring display priority information of buses comprised in the bus topological graph;

acquiring display interface information, wherein the display interface information comprises display weights of different areas in a display interface;

and displaying the bus topological graph according to the display priority information of the buses in the bus topological graph and the display weights of different areas in the display interface.

Further, the display weights of different areas in the display interface are area attention degrees pre-configured according to human visual characteristics.

Further, according to the vehicle topological graph template and the vehicle model configuration information, generating a bus topological graph corresponding to the vehicle model comprises:

acquiring a bus type in the vehicle model configuration information;

and determining display priority information corresponding to the bus type according to the bus type.

Further, according to the vehicle topological graph template and the vehicle model configuration information, generating a bus topological graph corresponding to the vehicle model further comprises:

dividing the buses into a root node bus and a sub-node bus according to the bus type;

determining display level number according to a display range of the bus topological graph and the display interface information; and determining the root node bus and the sub-node bus to be displayed according to the display level number.

Further, determining the root node bus and the sub-node bus to be displayed according to the display level number, then the following is further included:

displaying a bus mark for indicating sub-node bus information that is not displayed.

The method further includes:

receiving a bus mark selection instruction;

acquiring information about a selected undisplayed sub-node bus according to the bus mark selection instruction; and displaying the selected sub-node bus on the display interface.

The method further includes:

receiving a bus selection instruction;

acquiring selected bus information and sub-node bus information associated with the selected bus according to the bus selection instruction; and highlighting displaying the selected bus and a sub-node bus associated with the selected bus on the display interface.

Further, an embodiment of the present application also provides a vehicle bus topological graph display apparatus, comprising: a vehicle configuration information acquisition module, a topological graph template management module, a topological graph generation module, and a topological graph display module;

wherein the vehicle configuration information acquisition module is used for acquiring vehicle configuration information about a vehicle for which a bus topological graph is to be generated, the vehicle configuration information comprising a vehicle model and vehicle model configuration information;

the topological graph template management module is used for storing preset vehicle topological graph template information, and acquiring a vehicle topological graph template corresponding to the vehicle model according to the vehicle model;

the topological graph generation module is used for generating a bus topological graph corresponding to the vehicle model according to the vehicle topological graph template and the vehicle model configuration information;

the topological graph display module is used for acquiring display priority information about each bus included in the bus topological graph; and also used for acquiring display interface information, wherein the display interface information comprises display weights of different areas in the display interface, and displaying the bus topological graph according to the display priority information about each bus in the bus topological graph and display weights of different areas in the display interface.

Further, an embodiment of the present application also provides a vehicle detection device, comprising: a processor, a memory, a communication interface, and a communication bus, wherein the processor, the memory, and the communication interface complete mutual communication through the communication bus;

the memory is used for storing at least one executable instruction that causes the processor to execute the vehicle bus topological graph display method.

Further, an embodiment of the present application also provides a computer-readable storage medium, wherein at least one executable instruction is stored in the storage medium, and when the executable instruction runs on a vehicle bus topological graph display apparatus, the executable instruction causes the vehicle bus topological graph display apparatus to execute the vehicle bus topological graph display method.

In summary, according to the embodiments of the present application, display priorities are set for vehicle buses of various types, display weights of different display areas of a display interface are acquired, and the buses with different display priorities are displayed in different display areas, such that a user can conveniently view the buses, and the ease of use by the user is improved.

The above description is only an overview of the technical schemes of the embodiments of the invention. In order to understand the technical means of the embodiments of the invention more clearly, it can be implemented according to the contents of the description. In order to make the above and other purposes, features, and advantages of the embodiments of the invention more obvious and understandable, specific implementation modes of the invention are listed below.

BRIEF DESCRIPTION OF THE DRAWINGS

The drawings are only for the purpose of illustrating the implementation modes and are not to be construed as limiting the present invention. Moreover, like reference numerals denote like components throughout the drawings. In the drawings:

FIG. 1 shows a vehicle bus topological graph display method provided by an embodiment of the present invention;

FIG. 11 shows a schematic structural diagram of a topological graph template generation module provided by an embodiment of the present invention;

FIG. 12 shows a schematic structural diagram of a topological graph display module provided by an embodiment of the present invention;

DETAILED DESCRIPTION

Hereinafter, exemplary embodiments of the present invention will be described in more detail with reference to the accompanying drawings. While the drawings show exemplary embodiments of the invention, it should be understood that the invention may be implemented in various forms and should not be limited by the embodiments described herein.

In the process of vehicle maintenance and repair, it is often necessary to diagnose a vehicle with a vehicle diagnosis device. In order to improve the generality of the vehicle diagnosis device and effectively display a topological graph generated by a maintenance and repair device, an embodiment of the present application proposes a vehicle bus topological graph display method, the method being applied to a vehicle diagnosis device or a vehicle bus topological graph generating apparatus. The specific operation method is as shown in FIG. 1, including:

step 101, acquiring vehicle configuration information of a vehicle for which a topological graph is to be generated, wherein the vehicle configuration information comprises a vehicle model and vehicle model configuration information;

a user first, when performing vehicle diagnosis using the vehicle diagnosis device, receives vehicle configuration information selected by the user, for example: the vehicle brand and the vehicle model, etc.; the selection by the user is generally performed by operating the vehicle diagnosis device, and after selecting the vehicle brand and the vehicle model on an operation interface, the vehicle model configuration information about the vehicle is queried from a vehicle central gateway database connected to the vehicle diagnosis device; the vehicle central gateway database is a preset database in which the vehicle model configuration information of various brands and vehicle models is stored.

Step 102, according to the vehicle model and from a pre-set vehicle topological graph template database, acquire a vehicle topological graph template corresponding to the vehicle model.

After the vehicle diagnosis device acquires the vehicle model configuration information about the vehicle to be diagnosed, acquire a vehicle topological graph template corresponding to the vehicle model from a preset vehicle topological graph template database according to a vehicle model. The vehicle topological graph template information about multiple vehicle brands and vehicle models is pre-stored in the vehicle topological graph template database, and the vehicle brands and vehicle models correspond to the vehicle topological graph template information on a one-to-one basis as an index of the vehicle topological graph template information.

Figure 2:
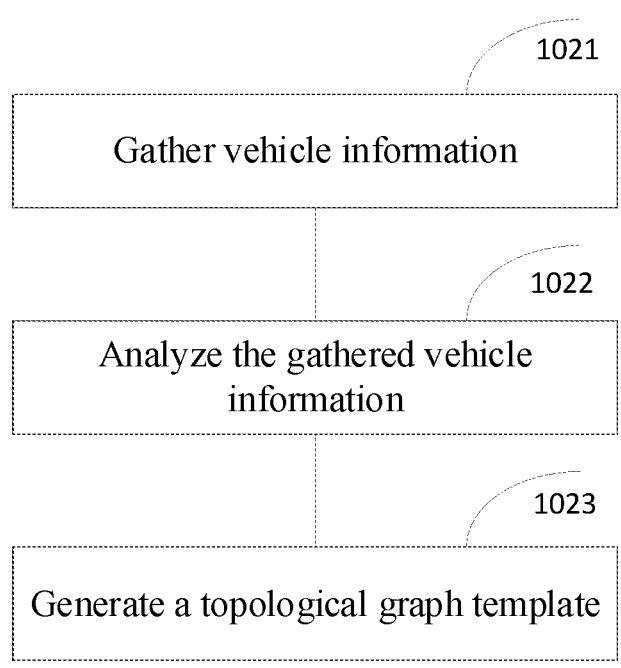
FIG. 2 shows a method for generating a vehicle bus topological graph template provided by an embodiment of the present invention.

The topological graph template information in the vehicle topological graph template database is pre-generated by the diagnosis device, or is one-time imported into the vehicle diagnosis device after vehicle information is analyzed by a dedicated device and a template is generated, and the generation method for the vehicle topological graph template is as shown in FIG. 2, including steps as follows.

Step 1021: collect vehicle information;

wherein due to the complexity of vehicle manufacturers and a large number of vehicle models, in order to acquire the topological graph information of all vehicle models as much as possible, it is necessary to collect vehicle information of various manufacturers and vehicle models in advance, the vehicle information mainly including the model information and the corresponding circuit diagram information, etc. of the vehicle; since the vehicle topological graph information of each major manufacturer is not disclosed to the outside, but is only integrated into its specific diagnostic tool, if a bus topological graph is generated for most vehicle models to be matched, it is necessary to collect information such as the brand, vehicle model, related vehicle model maintenance and repair data, training data, and circuit diagram from various channels.

Step 1022: analyze the collected vehicle information.

The vehicle information is analyzed after collecting the vehicle information as much as possible, comprising: extracting bus information, ECU (Electronic Control Unit) configuration information, connecting mode information, and the like contained in the circuit diagram according to the circuit diagram information. For the collected vehicle models, characteristics thereof are analyzed, such as: the ECU unit configuration supported by the vehicle, the functions of each unit, the dependency relationship between units, the number of buses installed by the vehicle, the characteristics of each bus (such as bus type, transmission rate, connecting mode, etc.), the connecting relationship between the ECU and the bus, etc.; according to the result of vehicle information analysis, the vehicle models with the same or similar ECU configurations and the same or similar connecting relationships between the ECU and the bus are classified into one and the same group, and the vehicle models with a large difference in ECU configurations and in the connecting relationship between the ECU and the bus are classified into different groups. The purpose of grouping is to refine common features between various vehicle models in order to establish a template. Of course, the above grouping standard can also be used in other ways, specifically as shown in Table 1.

TABLE 1

| Grouping characteristics | Analyzing method | Description |
| --- | --- | --- |
| Production platform | (1) Manufacturer;<br>(2) production line or the chassis; | Vehicle models by different manufacturers are not in the same group; |

6

TABLE 1-continued

| Grouping characteristics | Analyzing method | Description |
| --- | --- | --- |
| | | Vehicle models with the same chassis generally use the same template, and different chassis may share the same template; |
| ECU | (1) Whether the gateway configurations are the same;<br>(2) whether the functional ECU configurations of core components are the same;<br>(3) whether there is an inclusion relationship between the ECU sets of the whole vehicle (excluding specially added module); | Same group conditions: the functional ECUs of the gateway and the core component must be the same, and an inclusion relationship exists between the ECU sets of the whole vehicle; |
| Bus | (1) Whether the configurations of key buses, such as power bus and chassis bus, are the same;<br>(2) whether an inclusion relationship exists between sets of bus configurations;<br>(3) bus comparison in aspects such as bus type, transmission rate, connecting mode, and the number of buses; | Conditions for the same bus: the bus types and topological structures are the same, and the transmission rates of the buses are the same; |
| Connecting relation | (1) The connecting relationships between the ECU and the bus need to be compatible;<br>(2) the bridging relationships between buses need to be the same; | Compatible means that the bus set A1 of vehicle A is contained in the bus set B1 of vehicle B, and the connecting relationships between any ECU in vehicle A and the corresponding ECU in vehicle B to the bus A1 set are the same. |

Table 1 only shows some common grouping modes, and other grouping modes can also be used for grouping in practice.

Acquire bus information from the acquired vehicle information, number the bus, and scan different buses of all connections starting from a diagnostic joint, to a root node, then to a branch node, etc., and from top to bottom and from left to right. The bus may be numbered alphabetically or numerically or otherwise, such as starting from A, etc.

Figure 3:
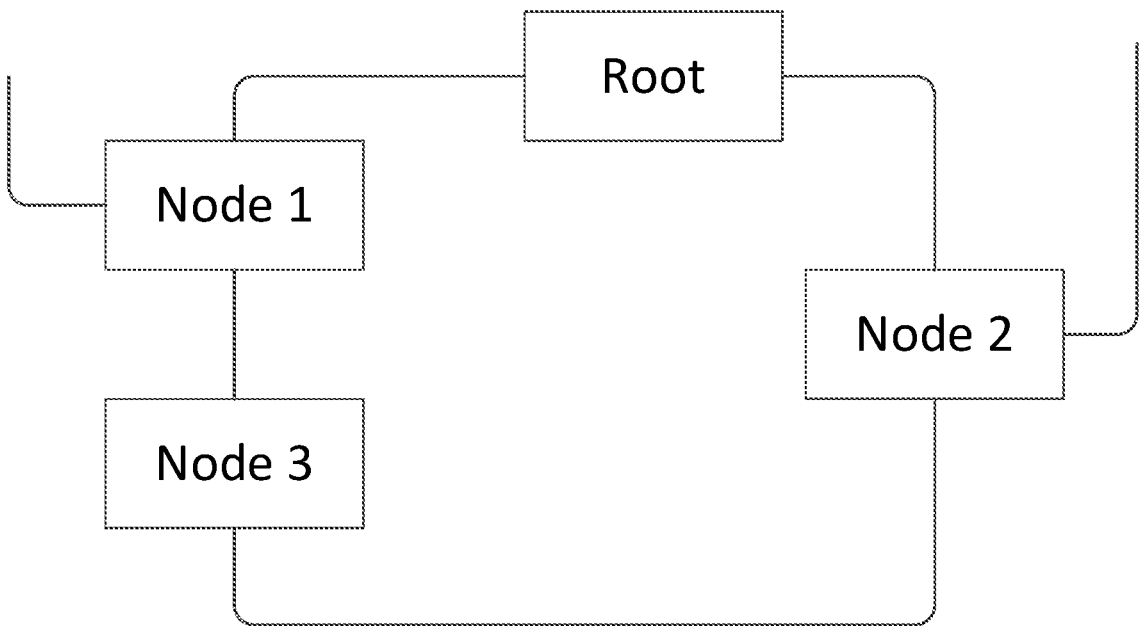
FIG. 3 shows a schematic diagram of an annular line provided by an embodiment of the present invention.

At the same time, the column gaps of the buses are numbered according to the arrangement of the buses to acquire vertical line information; the vertical line refers to a connecting line having a direct connecting relationship between two components to form a vertical line list; each vertical line parameter comprises a gap number, a column number, an arrangement order in the gap, etc. Loop line information is generated according to the arrangement of the buses to form a loop line list. Each loop line comprises parameters of four edges, namely, up, down, left, and right, as shown in FIG. 3, which is a structural diagram of a loop line, multiple nodes constituting one circular structure.

Figure 4:
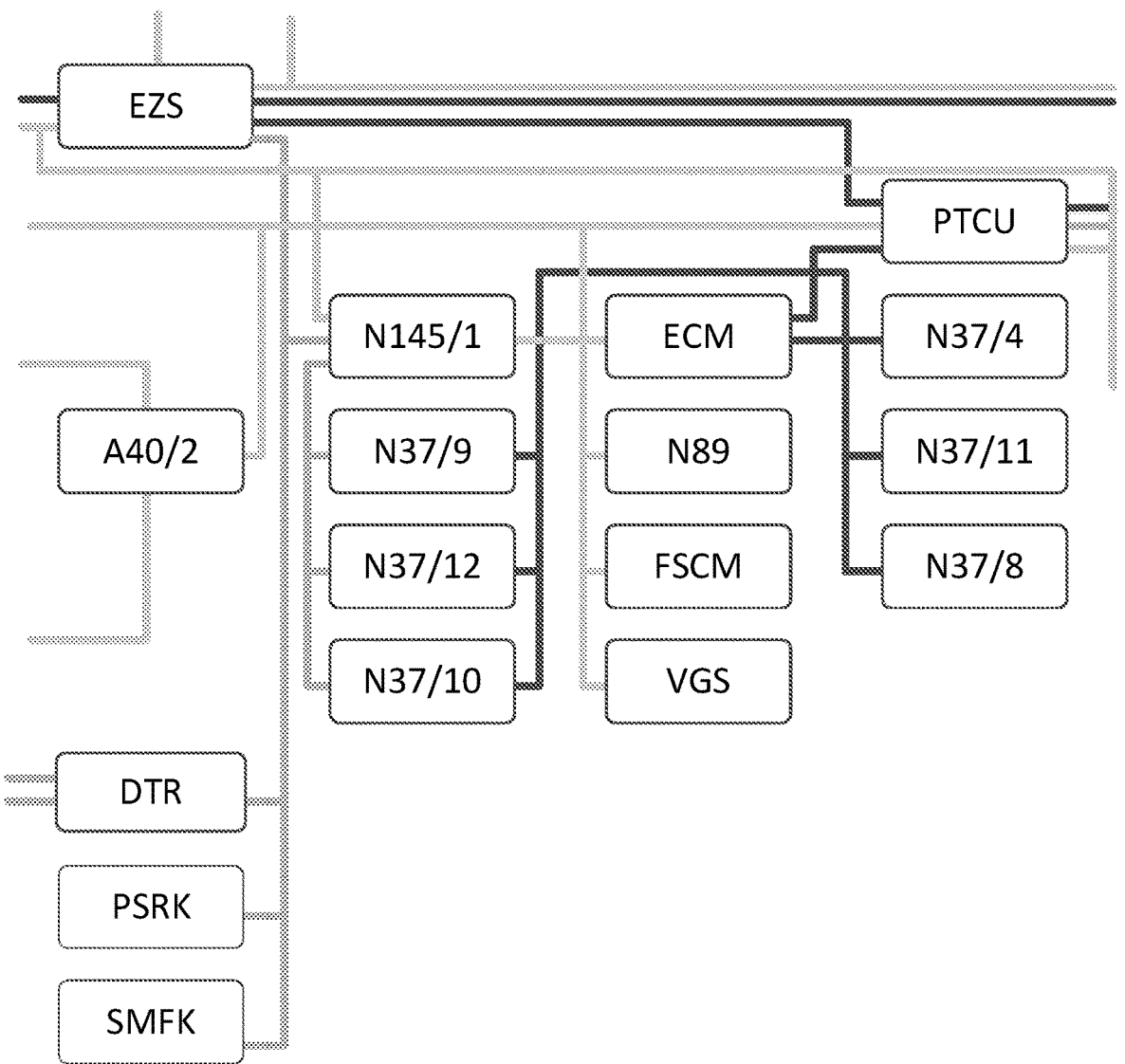
FIG. 4 shows a schematic diagram of a spanning line provided by an embodiment of the present invention.

At the same time, a spanning line can also be generated according to the arrangement of the buses, the spanning line referring to connecting line information spanning a vertical line, and a spanning line list is generated. Each spanning line comprises left vertical line information and right vertical line information and transverse spanning line information. As shown in FIG. 4, one bus spans the other bus to become a spanning line.

Further, the analysis of the vehicle information also includes assigning a display priority to the bus according to the determined type of the bus, such as the following instance where; the power bus is the most important. If there is a fault, which requires to perform stopping, then the priority is set to be the highest; for a general bus, such as lighting, the priority is low, as shown in Table 2.

TABLE 2

| Component | Importance | Priority |
|---|---|---|
| Power bus | Important; if it is faulty, the vehicle needs to stop | Very high |
| Chassis bus | Important; if it is faulty, the vehicle needs to stop | High |

TABLE 2-continued

| Component | Importance | Priority |
|---|---|---|
| A unit with a complicated bridging relationship or an important unit | Important | High |

TABLE 2-continued

| Component | Importance | Priority |
|---|---|---|
| Other buses | Generally, it doesn't affect vehicle stopping | Medium |

By setting different display priorities for different bus types, a high-priority bus can be displayed preferentially when the bus topological graph cannot be displayed completely.

Step 1023: generate a vehicle bus topological graph template.

After completing the analysis of the collected vehicle information, generate a topological graph template according to the analyzed bus information, ECU configuration information, and connecting mode information, wherein the connecting mode information comprises vertical line information, loop line information, spanning line information, etc. According to the above information, construct the bus topological graph template. The specific procedure is as shown in Table 3.

TABLE 3

| Step | Action | Method | Output |
|---|---|---|---|
| 1 | Bus numbering | Starting from the diagnostic joint DLC, to the Root node EZS, to the sub-Root node PTCU, and then to other ECU nodes, scan different buses of all connections from top to bottom and from left to right, and number from A, as shown in FIG. (3); | A bus list, wherein each bus includes a bus number, name, id, color, type, OBD connecting pin, etc., |
| 2 | Vertical line extraction | 1. Starting from G1, number the column gap as shown in FIG. (3); 2. Starting from G1 to G14, count different vertical lines that are not on the annular line M and the spanning line N, number from 0, and extract a vertical line parameter | A vertical line list, wherein each vertical line parameter includes a gap number or a column number where it is located, an arrangement order in the gap, a row number where the upper end and the lower end are located, etc .; |
| 3 | Input unit | Input a template unit into an algorithm from top to bottom and from left to right, wherein each ECU configuration includes information such as a unit number, an ID, a name, and a left and right bus connection; | An ECU list, wherein each ECU includes information such as an ECU number, a name, a left and right side connecting bus; |
| 4 | Input bus | Output the bus information obtained in step 1 to an algorithm; | |
| 5 | Input vertical line | Input the vertical line information obtained in step 2 into the algorithm; | |
| 6 | Input a loop line | Input information about the up, down, left, and right sides of the annular line to the algorithm; | An annular line list, wherein each annular line includes parameters of the four sides, namely, up, down, left, and right; |
| 7 | Input a spanning line | Input information about the left and right vertical lines and a spanning horizontal line of the spanning line to the algorithm; | A spanning line list, wherein each spanning line includes left vertical line and right vertical line information and horizontal spanning line information; |
| 8 | Construct a topological graph | Launch the algorithm to output a topological graph test image and evaluate the accuracy of the template | Template topological graph |

When the constructed vehicle bus topological graph template is input, the vehicle bus topological graph template is stored in a vehicle topological graph template database so that the vehicle bus topological graph generating apparatus is invoked at the time of operation.

The embodiment of the present application, through the above-mentioned vehicle bus topological graph template generating method, organizes, groups, and analyzes the collected vehicle information, numbers the bus, generates vertical line information, annular line information, and spanning line information, and generates a vehicle bus topological graph template according to the above-mentioned information; since the template generation is based on the collected vehicle information, a variety of topological graph templates can be generated with the maximization of shared vehicle information, increasing the usability and universality of the vehicle bus topological graph display apparatus.

Step 103, according to the vehicle topological graph template and the vehicle model configuration information, generate a bus topological graph corresponding to the vehicle model.

According to the acquired vehicle model configuration information, perform parameter substitution on the vehicle model configuration information according to the requirements of the vehicle topological graph template, and generate a bus topological graph corresponding to the vehicle model according to the vehicle topological graph template and the vehicle model configuration information. For example: ECU bus configuration information, information about a component connected to the bus, etc. wherein a vehicle bus topological graph corresponding to a selected vehicle brand and vehicle model is generated by combining the vehicle topological graph template and the vehicle model configuration information.

Step 104, acquire display priority information of buses comprised in the bus topological graph.

It can be seen from step 1022 that in the process of generating a topological graph template, the system would analyze the vehicle information, and allocate display priorities for different bus types according to the analyzed bus types. When topological graph display is performed, a display priority of a relevant bus type of a corresponding topological graph template is acquired from the vehicle topological graph template database.

Step 105, acquire display interface information, wherein the display interface information comprises display weights of different areas in a display interface.

Figures 5, 6:
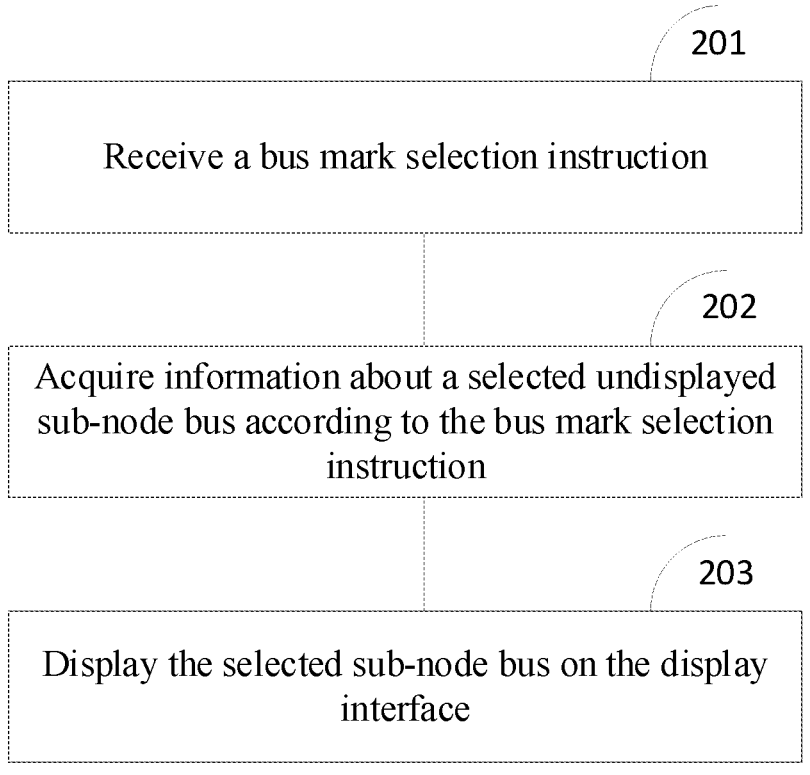
FIG. 5 shows a schematic diagram of display weights of different areas in a display interface provided by the embodiment of the present invention.
FIG. 6 shows a bus topological graph display method for a sub-node provided by an embodiment of the present invention.

In this embodiment, the display interface is divided into different areas, and display weights are set for different areas in the display interface. In an embodiment of the present invention, different display weights can be set for different display areas according to different sizes and shapes of a display interface in a display device in combination with the visual habits of the human eye, for example: in general, the area focused on by a human eye, or the field of view focused on by the first sight, is often located in an area above or to the left of the middle of the display interface; then, the embodiment of the present application sets the display weight of this area to be high, while the attention degree of the edge area is low, and the display weights of these areas are low; specifically, as shown in FIG. 5, different area numbers represent different display weights. By dividing the display interface into areas, the display can be performed in combination with the characteristics of a human body, so that a user can focus on a part that the user wants to focus on at once.

Step 106, display the bus topological graph according to the display priority information of the buses in the bus topological graph and the display weights of different areas in the display interface The display area of each bus in the display interface is determined according to the display priority of each bus in the bus topological graph and the display weight of different areas in the display interface, and the bus topological graph is displayed. In combination with the display priority determined by a vehicle analysis unit for each type of the buses, the topological graph display unit combines the display priority of the bus with the display weights of different areas of the display interface, displays a bus with a high priority in a high weight area of the display interface, and displays a bus with a low priority in a low weight area, as shown in Table 4.

TABLE 4

| Component | Priority | Display area |
| --- | --- | --- |
| Power bus | Very high | An area in the vicinity of weight 100 |
| Chassis bus | High | An area in the vicinity of weight 100 |
| A unit with a complicated bridging relationship or an important unit | High | An area in the vicinity of weight 75 |
| Other buses | Medium | An area between weight 50 and weight 25 |

Of course, further, the method can also determine the display level number according to a display range of the bus topological graph and the display interface information, and determine the display level of the bus topological graph to be displayed according to the display level number and the display priority of the bus, and the diagnostic device displays the bus topological graph according to the display level. In this way, the content of the display can be dynamically and adaptively adjusted to achieve a good display effect.

In practice, the topological graph shows the logical connecting relationship between buses of a vehicle as a whole, and can display the overall appearance of the connection between buses in the interface; however, if there are a lot of lines, and for some specific details, if all of them are shown, the screen will become very crowded, and lines of some buses will be caused to be poor to view; if there are fewer lines, it is better to display lines of some detail. Embodiments of the present application determine the display level adaptively according to the display range and display interface information of the bus topological graph, and automatically adjust the display content. Assuming that only 3 levels of lines can be displayed due to the limitations of the display interface, the system displays buses with high priority of the first three layers according to the priority of the buses, and buses with low priority are hidden. Meanwhile, in the display, in order to keep the topological graph arrangement compact, the left and right symmetrically configured units maintain the left and right symmetrical characteristics and are arranged near the top end of the topological graph, and the respective units are arranged in alphabetical order from top to bottom and from left to right.

In summary, according to the embodiments of the present application, display priorities are set for vehicle buses of various types, display weights of different display areas of a display interface are acquired, and the buses with different display priorities are displayed in different display areas, such that a user can conveniently view the buses, and the ease of use by the user is improved.

Figure 7:
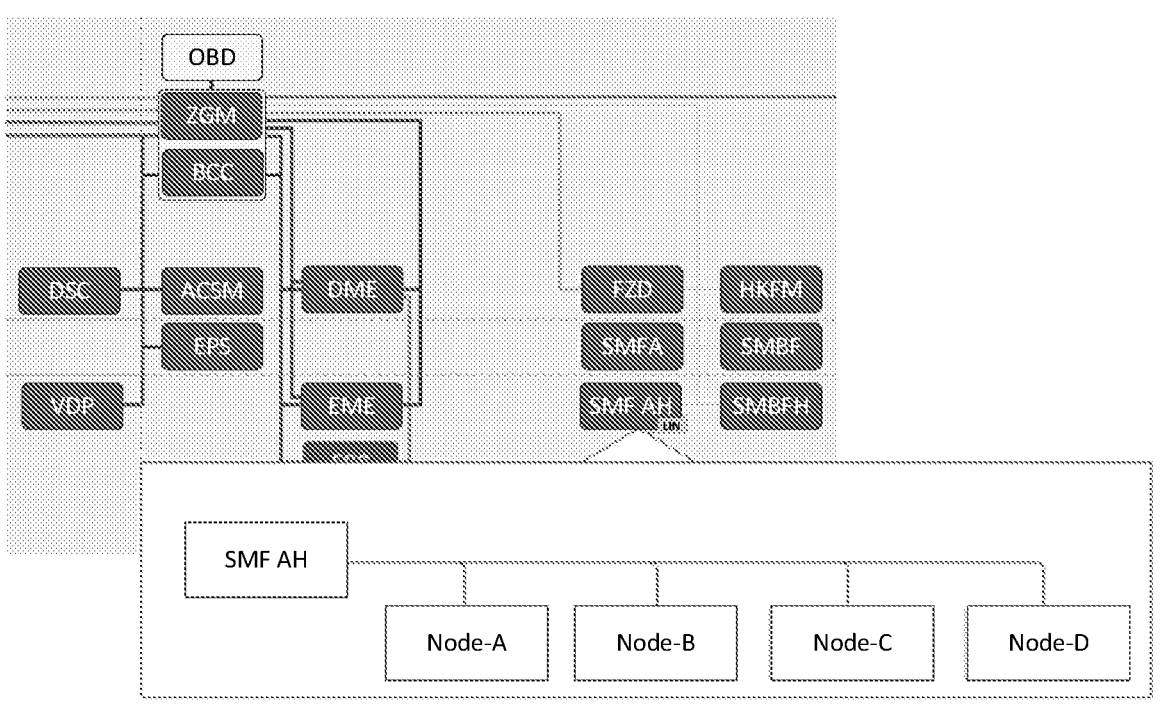
FIG. 7 shows a schematic diagram of a bus display interface of a sub-node provided by an embodiment of the present invention.

Further, due to the limitation of the display interface, for some buses which cannot be displayed at once, an embodiment of the present application also proposes another vehicle bus topological graph display method, as shown in FIG. 6. The method includes:

step 201: receiving a bus mark selection instruction;

wherein when a user displays a vehicle bus topological graph through a vehicle diagnostic device, and when it is desired to further view the information about an undisplayed sub-node bus related to a certain bus (such as: according to a default setting, a bus with a low priority is not displayed), a bus mark selection instruction is received via the display interface, the sub-node bus including vertical line information, loop line information, and spanning line information, etc. associated with the bus;

step 202: acquiring information about a selected undisplayed sub-node bus according to the bus mark selection instruction;

acquiring the information about a sub-node bus associated with a bus selected by the user according to the bus mark selection instruction, and acquiring all relevant line information according to the sub-node bus information; and step 203: displaying the selected sub-node bus on the display interface;

wherein according to the user's selection, the sub-node bus is displayed; as shown in FIG. 7, the connection of the LIN bus is not shown in the topological graph (if it is shown, the whole page is too complicated and bulky), and the LIN mark is made on the SMF AH unit; the mark is clicked, and the connecting relationship of the unit LIN bus can be displayed in the popped-up box; as shown in the figure, the LIN mark of SMF AH is clicked, and the schematic diagram of the LIN bus connection of the SMF AH is displayed. Of course, there can be multiple display modes of the sub-node bus, and one display mode can display a line diagram of a sub-node bus through a small window on the basis of the original topological graph display interface; the topological graph of the sub-node bus can also be displayed in a new window, and the user can return to the original topological graph display interface by way of backspacing; in particular, there are still many other display modes, and the applicant herein does not make a limitation.

Figure 8:
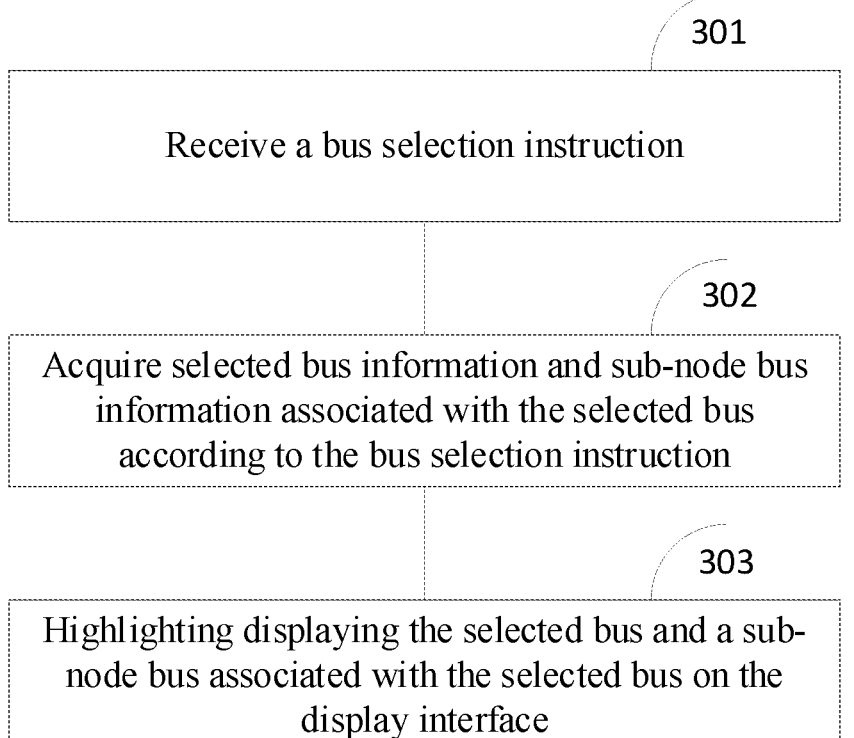
FIG. 8 shows a bus highlighting display method provided by an embodiment of the present invention.
Figure 9:
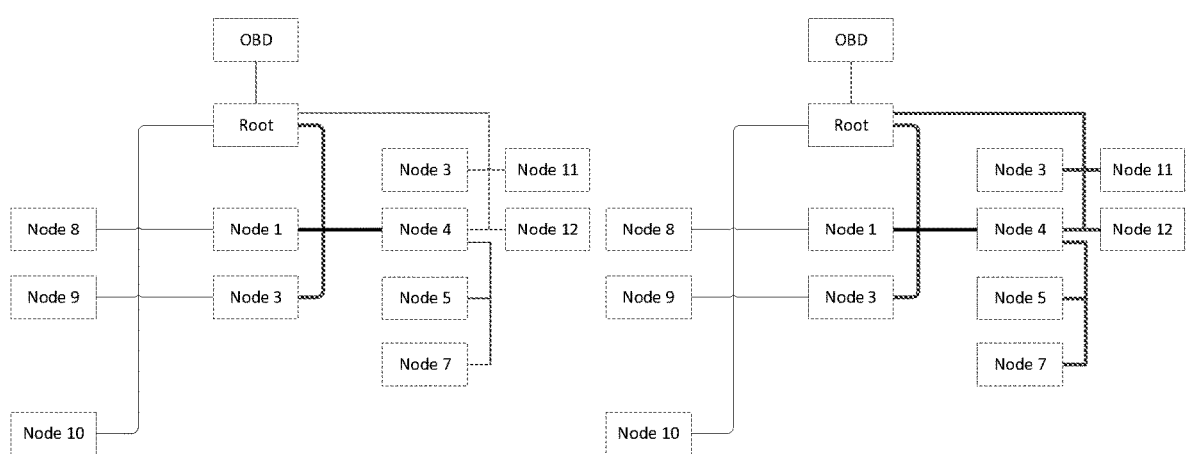
FIG. 9 shows a schematic diagram of a selected bus display provided by an embodiment of the present invention.

Further, in the vehicle bus topological graph, due to the relatively large number of bus types and buses, and the existence of loop lines and spanning lines, etc., when users use it, they often need to distinguish the attribution of each line, which is quite laborious to distinguish. Based on the above-mentioned embodiments, an embodiment of the present application further proposes a vehicle bus topological graph display method, as shown in FIG. 8, including:

step 301: receiving a bus selection instruction;

wherein when a user wants to focus on a certain bus, he chooses to focus on the bus on a diagnostic device's operating interface, and the diagnostic device receives a bus selection instruction;

step 302: acquiring selected bus information and sub-node bus information associated with the selected bus according to the bus selection instruction;

and according to the bus selection instruction, acquiring the selected bus information from the system, and acquiring sub-node bus information associated with the selected bus; and step 303: displaying the selected bus and the sub-node bus associated with the selected bus on a display interface;

wherein as shown in FIG. 9, the selected bus is highlighted and boldly displayed, and other ECU buses, etc. are set to a reverse color (usually grey); similarly, the ECU may also be selected, the selected ECU and the bus to which the ECU is connected are both highlighted and boldly displayed, and the other parts display the reverse color.

In this way, the bus that is focused on can be highlighted for display according to the user's selection, facilitating the user's view.

Figure 10:
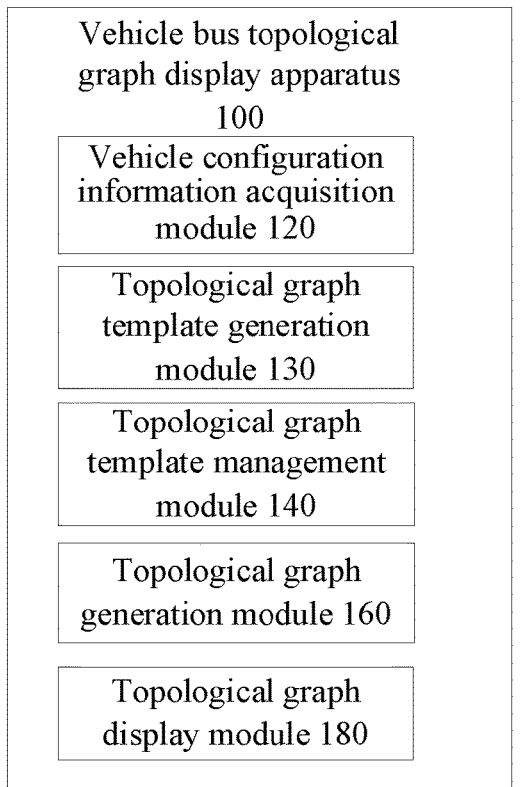
FIG. 10 shows a schematic structural diagram of a vehicle bus topological graph display apparatus provided by an embodiment of the present invention.

Further, an embodiment of the present application also proposes a vehicle bus topological graph display apparatus 100, as shown in FIG. 10, including a vehicle configuration information acquisition module 120, a topological graph template management module 140, a topological graph generation module 160, and a topological graph display module 180.

The vehicle configuration information acquisition module 120 is used for acquiring vehicle configuration information about a vehicle for which a bus topological graph is to be generated, the vehicle configuration information comprising a vehicle model and vehicle model configuration information;

the topological graph template management module 140 is used for storing preset vehicle topological graph template information, and acquiring a vehicle topological graph template corresponding to the vehicle model according to the vehicle model;

the topological graph generation module 160 is used for generating a bus topological graph corresponding to the vehicle model according to the vehicle topological graph template and the vehicle model configuration information;

the topological graph display module 180 is used for acquiring display priority information about each bus included in the bus topological graph; and also used for acquiring display interface information, wherein the display interface information comprises display weights of different areas in the display interface, and displaying the bus topological graph according to display priority information about each bus in the bus topological graph and display weights of different areas in the display interface.

Further, the vehicle bus topological graph display apparatus further comprises a topological graph template generation module 130, as shown in FIG. 11. The topological graph template generation module 130 comprises a vehicle information collecting unit 131, a vehicle information analysis unit 132, and a topological graph template generation unit 133. The topological graph template generation module is used for gathering and organizing information about various brands and models of vehicles before the application of the vehicle bus topological graph display apparatus, and generating a topological graph template according to the gathered information.

The vehicle information gathering unit 131 is used for acquiring model information and circuit diagram information about the vehicle.

The vehicle information analysis unit 132 is configured to extract bus information, ECU configuration information, connecting mode information, etc. included in the circuit diagram according to the circuit diagram information. The vehicle information analysis unit acquires bus information from the acquired vehicle information, and numbers the buses, scans different buses of all connections starting from the diagnostic joint, to the root node, to the branch node, etc. from top to bottom, and from left to right.

The topological graph template generation unit 133 is used for generating a topological graph template according to the bus information, ECU configuration information, and connecting mode information.

Further, the topological graph display module 180 includes a display weight determination unit 181 and a topological graph display unit 182, as shown in FIG. 12.

The display weight determination unit 181 is used for acquiring display interface information, and setting display weights for different areas in the display interface according to the display interface information.

The topological graph display unit 182 is used for determining the display area of each bus in the display interface according to the display priority of each bus in the bus topological graph and the display weight of different areas in the display interface, and displaying the bus topological graph.

Further, the topological graph display module 180 also comprises a display level determination unit 183, as shown in FIG. 12. The display level determination unit 183 is used for determining a display level number according to the display range of the bus topological graph and the display interface information, and determining the display level of a bus topological graph to be displayed according to the display level number and the display priority of the bus, and the topological graph display unit displays the bus topological graph according to the display level.

Further, the topological graph display module also comprises a sub-unit information display unit 184, and the sub-unit information display unit 184 is used for receiving a bus selection instruction; and displaying vertical line information, loop line information, and spanning line information associated with the bus according to the bus selection instruction.

It can be seen from the above that the embodiments of the present application set a display priority for each bus of a vehicle via a vehicle bus topological graph display apparatus, and at the same time, by acquiring display weights of different display areas of a display interface, display buses with different display priorities in different display areas, so as to enable a user to conveniently view the same and improve the attention degree of the user.

Figure 13:
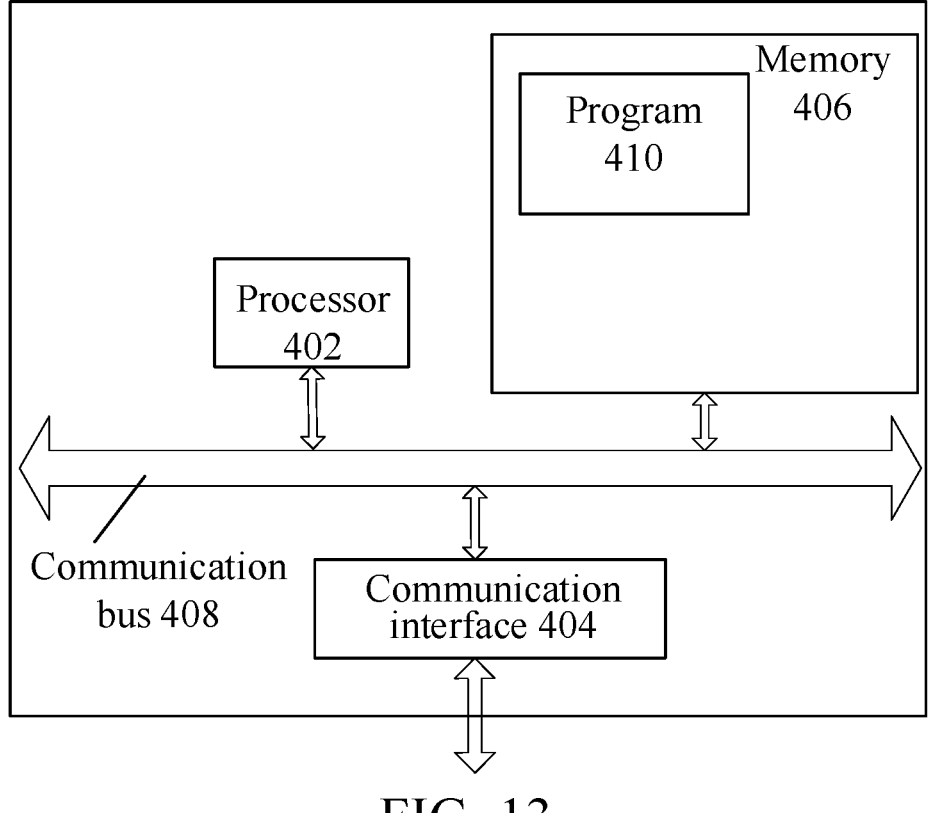
FIG. 13 shows a schematic diagram of a vehicle detection device provided by an embodiment of the present invention.

Further, an embodiment of the present application also proposes a vehicle detection device, as shown in FIG. 13. The vehicle detection device can include a processor 402, a communication interface 404, a memory 406, and a communication bus 408.

The processor 402, the communication interface 404, and the memory 406 complete mutual communication through the communication bus 408. The communication interface 404 is used for communicating with a network element of other devices, such as a client, or other servers. The processor 402 is used to execute a program 410, and specifically, the relevant steps in the above embodiment of a vehicle bus topological graph display method can be executed.

In particular, the program 410 may include a program code comprising a computer-executable instruction.

The processor 402 may be a central processing unit CPU, or an application-specific integrated circuit ASIC, or one or more integrated circuits configured to implement an embodiment of the present invention. The vehicle detection device comprises one or more processors, which may be the same type of processor, such as one or more CPUs; or may also be processors of different types, such as one or more CPUs and one or more ASiCs.

The memory 406 is used for storing a program 410. The memory 406 may include a high-speed RAM memory, or may also include non-volatile memory, such as at least one disk memory.

The program 410 may be specifically called by the processor 402 to cause the vehicle detection device to execute the following operations:

acquiring vehicle configuration information of a vehicle for which a topological graph is to be generated, wherein the vehicle configuration information comprises a vehicle model and vehicle model configuration information;

according to the vehicle model and from a pre-set vehicle topological graph template database, acquiring a vehicle topological graph template corresponding to the vehicle model;

according to the vehicle topological graph template and the vehicle model configuration information, generating a bus topological graph corresponding to the vehicle model;

acquiring display priority information of buses comprised in the bus topological graph;

acquiring display interface information, wherein the display interface information comprises display weights of different areas in a display interface;

and displaying the bus topological graph according to the display priority information of the buses in the bus topological graph and the display weights of different areas in the display interface.

Further, the display weights of different areas in the display interface are area attention degrees pre-configured according to human visual characteristics.

Further, according to the vehicle topological graph template and the vehicle model configuration information, generating a bus topological graph corresponding to the vehicle model comprises:

acquiring a bus type in the vehicle model configuration information;

and determining display priority information corresponding to the bus type according to the bus type.

Further, according to the vehicle topological graph template and the vehicle model configuration information, generating a bus topological graph corresponding to the vehicle model further comprises:

dividing the buses into a root node bus and a sub-node bus according to the bus type;

determining the display level number according to the display range of the bus topological graph and the display interface information; and determining the root node bus and the sub-node bus to be displayed according to the display level number.

Further, determining the root node bus and the sub-node bus to be displayed according to the display level number, then the following is further included:

displaying a bus mark for indicating the sub-node bus information that is not displayed.

The method further includes:

receiving a bus mark selection instruction;

acquiring information about a selected undisplayed sub-node bus according to the bus mark selection instruction; and displaying the selected sub-node bus on the display interface.

The method further includes:

receiving a bus selection instruction;

acquiring selected bus information and sub-node bus information associated with the selected bus according to the bus selection instruction; and highlighting displaying the selected bus and the sub-node bus associated with the selected bus on a display interface.

The embodiments of the present application set a display priority for each bus of a vehicle, and at the same time, by acquiring display weights of different display areas of a display interface, buses with different display priorities are displayed in different display areas, so as to enable a user to view it conveniently and improve the attention degree of the user.

An embodiment of the present invention further provides a computer program that can be called by a processor to execute the vehicle bus topological graph display method in any of the above method embodiments.

An embodiment of the disclosure provides a computer program product including a computer program stored on a computer-readable storage medium. The computer program includes program instructions which, when running on a computer, cause the computer to execute the vehicle bus topological graph display method of any of the method embodiments described above.

The algorithm or display provided herein is not inherently related to any particular computer, virtual system, or other devices. Various general-purpose systems may also be used with the teachings based on what is disclosed herein. According to the above description, the structure required to construct such a system is obvious. Further, embodiments of the present invention are not directed to any particular programming language. It should be understood that the contents of the invention described herein can be realized by using various programming languages, and the description of the specific language is to disclose the best implementation mode of the invention.

In the description provided herein, numerous specific details are set forth. However, it could be understood that embodiments of the invention may be practiced without these specific details. In some instances, well-known methods, structures, and techniques have not been shown in detail in order not to obscure the understanding of this description.

Similarly, it should be understood that in the above description of example embodiments of the invention, various features of the embodiments of the invention are sometimes grouped together in a single embodiment, figure, or the description thereof for the purpose of streamlining the invention and aiding in the understanding of one or more of the various inventive aspects. However, the disclosed method should not be interpreted as reflecting the intention that the claimed invention requires more features than those clearly recorded in each claim.

It could be understood by those skilled in the art that the modules in the devices in the embodiments may be changed adaptively and arranged in one or more devices different from the embodiment. Modules or units or assemblies in an embodiment may be combined into one module or unit or assembly and may be divided into multiple sub-modules or sub-units or sub-assemblies. Except that at least some of such features and/or processes or units are mutually exclusive, all features disclosed in the description (including accompanying claims, abstract, and drawings) and all processes or units of any method or device so disclosed can be combined in any combination. Each feature disclosed in the description (including any accompanying claims, abstract, and drawings) may be replaced by alternative features serving the same, equivalent, or similar purpose, unless expressly stated otherwise.

It should be noted that the above-mentioned embodiments illustrate rather than limit the invention, and that those skilled in the art can design alternative embodiments without departing from the scope of the appended claims. In the claims, any reference sign placed in a bracket shall not be construed as limiting the claims. The word "comprising" does not exclude the presence of an element or a step other than those listed in a claim. The word "a" or "one" preceding an element does not exclude the presence of multiple such elements.

The present invention can be implemented by means of hardware comprising several distinct elements, and by means of a suitably programmed computer. In a unit claim enumerating several devices, several devices of these devices can be specifically embodied by one and the same item of hardware. The use of the words first, second, third, etc. does not denote any order. These words may be interpreted as names. The steps in the above embodiments are not to be construed as limiting the order of execution unless otherwise specified.

The invention claimed is:

1. A vehicle bus topological graph display method, comprising:

acquiring vehicle configuration information of a vehicle for which a topological graph is to be generated, wherein the vehicle configuration information comprises a vehicle model and vehicle model configuration information;

according to the vehicle model and from a pre-set vehicle topological graph template database, acquiring a vehicle topological graph template corresponding to the vehicle model;

according to the vehicle topological graph template and the vehicle model configuration information, generating a bus topological graph corresponding to a vehicle model;

acquiring display priority information of buses comprised in the bus topological graph;

acquiring display interface information, wherein the display interface information comprises display weights of different areas in a display interface; and displaying the bus topological graph according to the display priority information of the buses in the bus topological graph and the display weights of different areas in the display interface.

2. The vehicle bus topological graph display method according to claim 1, wherein the display weights of different areas in the display interface are area attention degrees pre-configured according to human visual characteristics.

3. The vehicle bus topological graph display method according to claim 1, wherein the according to the vehicle topological graph template and the vehicle model configuration information, generating a bus topological graph corresponding to a vehicle model comprises:

acquiring a bus type in the vehicle model configuration information;

and determining display priority information corresponding to the bus type according to the bus type.

4. The vehicle bus topological graph display method according to claim 2, wherein the according to the vehicle topological graph template and the vehicle model configuration information, generating a bus topological graph corresponding to the vehicle model further comprises:

dividing the buses into a root node bus and a sub-node bus according to the bus type;

determining display level number according to a display range of the bus topological graph and the display interface information; and determining the root node bus and the sub-node bus to be displayed according to the display level number.

5. The vehicle bus topological graph display method according to claim 4, wherein after determining the root node bus and the sub-node bus to be displayed according to the display level number, the method further comprises:

displaying a bus mark for indicating sub-node bus information that is not displayed.

6. The vehicle bus topological graph display method according to claim 5, wherein the method further comprises:

receiving a bus mark selection instruction;

acquiring information about a selected undisplayed sub-node bus according to the bus mark selection instruction; and displaying the selected sub-node bus on the display interface.

7. The vehicle bus topological graph display method according to claim 4, wherein the method further comprises:

receiving a bus selection instruction;

acquiring selected bus information and sub-node bus information associated with the selected bus according to the bus selection instruction; and highlighting displaying the selected bus and a sub-node bus associated with the selected bus on the display interface.

8. A non-transitory computer-readable storage medium, wherein at least one executable instruction is stored in the storage medium, and when the executable instruction runs on a vehicle bus topological graph display apparatus, the executable instruction causes the vehicle bus topological graph display apparatus to perform following method:

acquiring vehicle configuration information of a vehicle for which a topological graph is to be generated, wherein the vehicle configuration information comprises a vehicle model and vehicle model configuration information;

according to the vehicle model and from a pre-set vehicle topological graph template database, acquiring a vehicle topological graph template corresponding to the vehicle model;

according to the vehicle topological graph template and the vehicle model configuration information, generating a bus topological graph corresponding to a vehicle model;

acquiring display priority information of buses comprised in the bus topological graph;

acquiring display interface information, wherein the display interface information comprises display weights of different areas in a display interface; and displaying the bus topological graph according to the display priority information of the buses in the bus topological graph and the display weights of different areas in the display interface.

9. The non-transitory computer-readable storage medium according to claim 8 wherein the according to the vehicle topological graph template and the vehicle model configuration information, generating a bus topological graph corresponding to a vehicle model comprises:

acquiring a bus type in the vehicle model configuration information;

and determining display priority information corresponding to the bus type according to the bus type.

10. The non-transitory computer-readable storage medium according to claim 9, wherein the according to the vehicle topological graph template and the vehicle model configuration information, generating a bus topological graph corresponding to the vehicle model further comprises:

dividing the buses into a root node bus and a sub-node bus according to the bus type;

determining display level number according to a display range of the bus topological graph and the display interface information; and determining the root node bus and the sub-node bus to be displayed according to the display level number.

11. The non-transitory computer-readable storage medium according to claim 10, wherein after determining the root node bus and the sub-node bus to be displayed according to the display level number, the vehicle bus topological graph display apparatus further:

displays a bus mark for indicating sub-node bus information that is not displayed.

12. The non-transitory computer-readable storage medium according to claim 11, the vehicle bus topological graph display apparatus further:

receives a bus mark selection instruction;

acquires information about a selected undisplayed sub-node bus according to the bus mark selection instruction; and displays the selected sub-node bus on the display interface.

13. The non-transitory computer-readable storage medium according to claim 10, the vehicle bus topological graph display apparatus further:

receives a bus selection instruction;

acquires selected bus information and sub-node bus information associated with the selected bus according to the bus selection instruction; and highlighting displays the selected bus and a sub-node bus associated with the selected bus on the display interface.

14. A vehicle detection device, comprising: a processor, a memory, a communication interface, and a communication bus, wherein the processor, the memory, and the communication interface complete mutual communication through the communication bus;

the memory is used for storing at least one executable instruction that causes the processor to perform the following method:

acquiring vehicle configuration information of a vehicle for which a topological graph is to be generated, wherein the vehicle configuration information comprises a vehicle model and vehicle model configuration information;

according to the vehicle model and from a pre-set vehicle topological graph template database, acquiring a vehicle topological graph template corresponding to the vehicle model;

according to the vehicle topological graph template and the vehicle model configuration information, generating a bus topological graph corresponding to a vehicle model;

acquiring display priority information of buses comprised in the bus topological graph;

acquiring display interface information, wherein the display interface information comprises display weights of different areas in a display interface; and displaying the bus topological graph according to the display priority information of the buses in the bus topological graph and the display weights of different areas in the display interface.

15. The vehicle detection device according to claim 14, wherein the according to the vehicle topological graph template and the vehicle model configuration information, generating a bus topological graph corresponding to a vehicle model comprises:

acquiring a bus type in the vehicle model configuration information;

and determining display priority information corresponding to the bus type according to the bus type.

16. The vehicle detection device according to claim 14, wherein the display weights of different areas in the display interface are area attention degrees pre-configured according to human visual characteristics.

17. The vehicle detection device according to claim 16, wherein the according to the vehicle topological graph template and the vehicle model configuration information, generating a bus topological graph corresponding to the vehicle model further comprises:

dividing the buses into a root node bus and a sub-node bus according to the bus type;

determining display level number according to a display range of the bus topological graph and the display interface information; and determining the root node bus and the sub-node bus to be displayed according to the display level number.

18. The vehicle detection device according to claim 17, wherein the processor further:

receives a bus selection instruction;

acquires selected bus information and sub-node bus information associated with the selected bus according to the bus selection instruction; and highlighting displays the selected bus and a sub-node bus associated with the selected bus on the display interface.

19. The vehicle detection device according to claim 17, wherein after determining the root node bus and the sub-node bus to be displayed according to the display level number, the processor further:

displays a bus mark for indicating sub-node bus information that is not displayed.

20. The vehicle detection device according to claim 19, wherein the processor further:

receives a bus mark selection instruction;

acquires information about a selected undisplayed sub-node bus according to the bus mark selection instruction; and displays the selected sub-node bus on the display interface.

* * * * *